April 18, 1944.  J. D. LARSON  2,347,114
METHOD AND MEANS FOR PREVENTING ICE FORMATION ON SURFACES
Filed Oct. 13, 1941
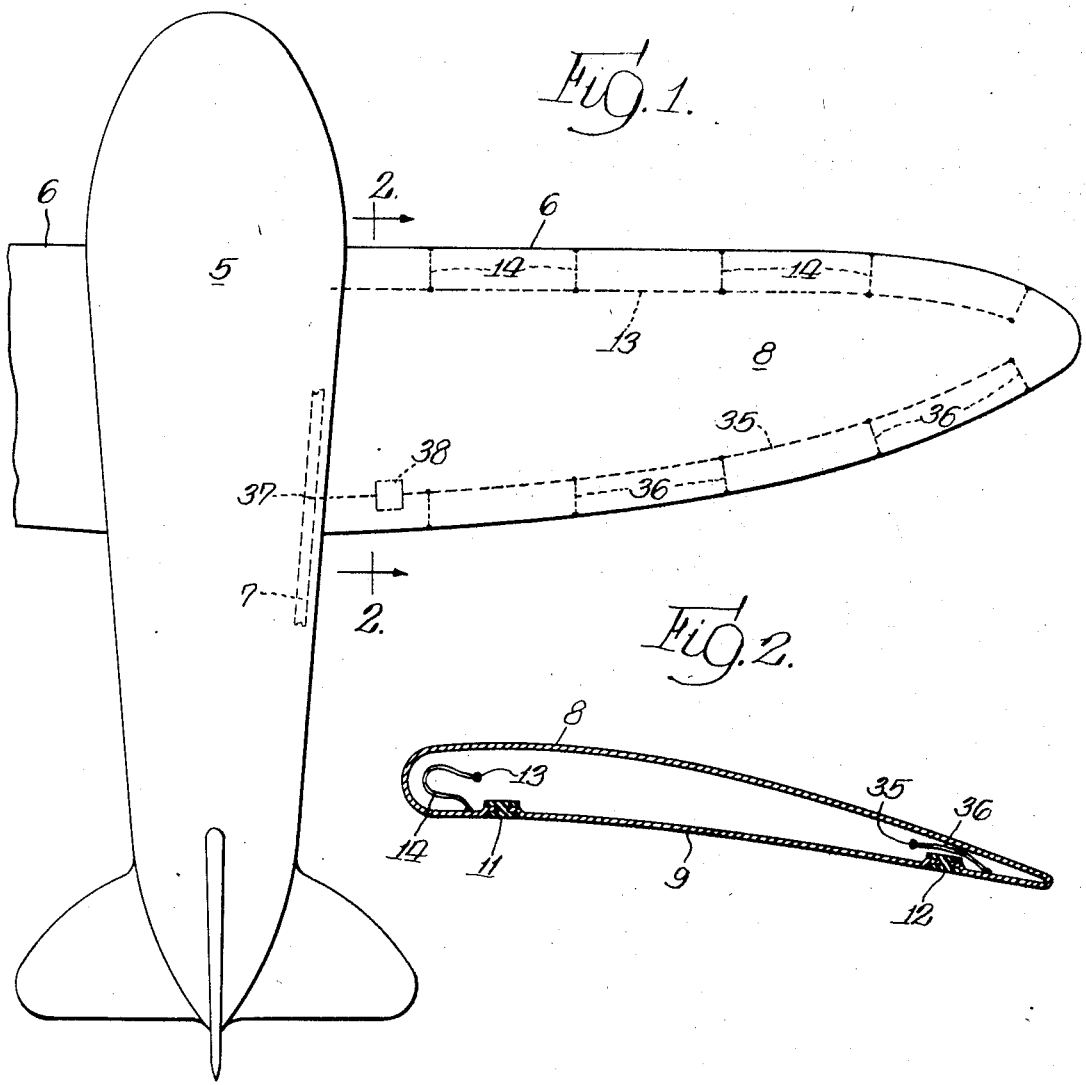
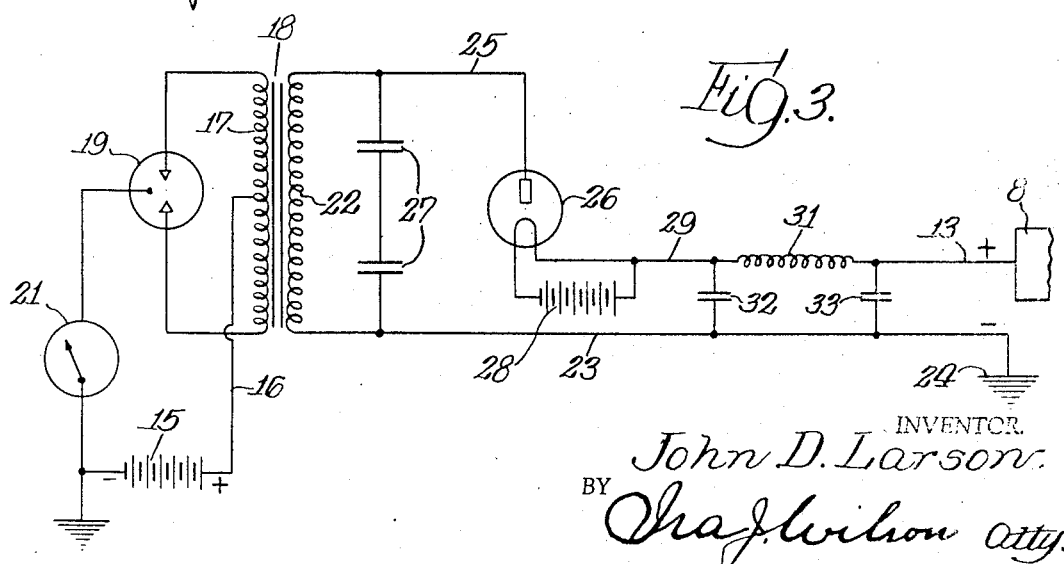
INVENTOR.
John D. Larson.
BY Chas J Wilson Atty.

Patented Apr. 18, 1944

2,347,114

UNITED STATES PATENT OFFICE 2,347,114

METHOD AND MEANS FOR PREVENTING ICE FORMATION ON SURFACES

John D. Larson, Hinsdale, Ill.

Application October 13, 1941, Serial No. 414,730

7 Claims. (Cl. 244—134)

This invention relates in general to a method and means for preventing the solidification of liquids at normal freezing temperatures. While the principle of my invention may be utilized to either raise or lower the freezing temperatures of various liquids for a wide variety of commercial purposes, I have selected and here disclose for illustrative purposes an embodiment of my invention adapted for preventing the formation of ice on aeroplane surfaces at temperatures normally conducive to ice formation.

That pure water freezes at 32° Fahrenheit is a generally accepted fact, but the common occurrence of alternate freezing and melting without change in temperature is a phenomenon not heretofore satisfactorily accounted for. I have determined, however, that the congealing of liquids into ice and conversely the melting of ice into liquid are dependent not solely upon the temperature factor but also upon the electrical status of the liquid both with respect to polarity and potential.

I have also determined that the electrical polarity and potential of the atmosphere fluctuate within a considerable range, and that the aggregate sum of these two types of fluctuations correlates closely with temperature trends. A positive ionization potential of the atmosphere is conducive to and invariably accompanies evaporation of moisture, while a negative ionization of atmospheric potential invariably exists when freezing occurs.

It is manifest, therefore, that the phenomenon of alternate freezing and melting at constant temperature is due to atmospheric ionization fluctuations under a comparatively low degree of potential.

Experimentation has demonstrated that the conversion of a liquid into a solid may be effected under constant approximate freezing temperature by producing a condition of intensified negative ionization, and, conversely, that the solid may be restored to liquid form at the same temperature by producing a condition of positive ionization.

In accordance with the principles of my invention based upon the determinations above briefly mentioned, I am able to prevent the formation of ice on aeroplane surfaces by creating on the surfaces to be protected a condition of positive electrical potential of sufficient intensity to induce a positive ionization of the liquid particles contacting such surfaces so that such particles will not congeal at 32° F. or for several degrees below that normal freezing temperature. In this manner the freezing of ice on the aeroplane surfaces is inhibited or retarded until a lower temperature corresponding with the degree of imposed positive potential has been reached. As this temperature, however, the moisture in the surrounding atmosphere has already been congealed under normal conditions into either hail or snow which will not adhere to the plane surfaces, consequently the application of positive potential to the surfaces may at this point be discontinued.

As illustrative of one simple form of apparatus by which the principles of my invention may be utilized in the protection of aeroplanes from ice accumulations, reference may be had to the accompanying drawing.

Referring to the drawing,

Fig. 1 is a fragmentary plan view of an aeroplane equipped in accordance with the principles of my invention;

Fig. 2 is a sectional view on the line 2—2 of Fig. 1; and

Fig. 3 is a wiring diagram of a circuit suitable for creating the requisite positive potential.

On the drawing, reference character 5 indicates the fuselage to which the wings 6 are attached and 7 indicates a fragment of the fuselage chassis or framework which serves as a ground for the circuit.

For purposes of simplicity the leading edges and top surfaces of the wings only are shown on the drawings as being equipped to resist ice formation, but it should be obvious that the propeller blades and other areas of the aeroplane may be similarly equipped should necessity for so doing become apparent. It should also be obvious that while only one of the wings is illustrated as being equipped for ice combating purposes, both wings of a monoplane and all wings of a multi-plane would, of course, be similarly equipped.

As illustrated on the drawing and without reference to the structural details which are not disclosed and may be of any approved form, the leading edge and top surface of each wing is formed from or covered with an electrical conducting material, such as metal sheeting for instance, indicated by reference character 8 composed of one or as many sections as may be best suited for economical fabrication. The exposed areas which it is desired to protect against ice formation are electrically insulated from the fuselage by the employment of suitable insulating material and are also insulated from the lower surfaces 9 of the wings by suitable insulation strips such as 11 and 12.

For the purpose of impressing upon or applying to the exposed areas to be protected a positive electrical potential of sufficient intensity to induce a positive ionization in the liquid particles which may be brought in contact with these surfaces, I have extended within each wing and preferably near the lead edge thereof a conductor 13 in the form of a wire connected through a plurality of branches 14 with the wing surface near the lead edge. The number of branches may vary in different installations, their purpose being merely to distribute the electrical charge throughout the area of the wing so as to preclude short-circuiting through any portion of the wing which may be more highly conductive than some other portion.

The potential applied to the wing surface is of the direct current type. The amperage is very low, not more than a few milliamperes, but the voltage is high and preferably ranges between 15,000 and 20,000 volts, depending, of course, upon the area of the exposed surface to be protected. I have found that, roughly speaking, one volt per square centimeter of exposed area to be protected is adequate for the purposes and may be accepted as an approximation for design purposes.

The current for producing the requisite potential may be derived from any suitable source, but for practical purposes in aeroplane design the employment of batteries will probably be most satisfactory. Any suitable circuit capable of delivering a low amperage high potential current may be utilized, such, for instance, as the circuit disclosed in Fig. 3, which is shown merely for illustrative purposes. In this circuit the current from the six-volt battery 15 passes through line 16 to the primary coil 17 of the transformer 18. From these coils the current returns in alternation to the vibrator 19, thence through the meter 21 back to the origin.

The secondary coil 22 of the transformer is grounded through line 23 at 24 and the opposite end of the coil is connected through line 25 with the rectifier 26. Condensers 27 are preferably included between lines 23 and 25. A secondary battery 28, preferably of about seven and one-half volts capacity, depending on the type of rectifying tube employed, is connected in line 29 leading from the rectifier and terminating in the lead 13 which is connected through branches 14 to the wing surface 8. For purposes of current uniformity and smoothness, a resistor 31, preferably of wire wound type, may be interposed in line 29 and condensers 32 and 33 may be connected across lines 23 and 29.

It will be apparent that a direct current of positive potential, low amperage and high voltage will be delivered by this hook-up to the wing surfaces 8 to be protected. These surfaces may be wholly insulated from the remainder of the plane, in which case a suitable dielectric material employed in conjunction with the insulation should cause the charged surfaces to serve as an accumulator in a manner similar to a condenser. The accumulation of such an intense charge, however, would, of course, be conducive to sparking which involves an element of danger in the vicinity of the fuel tanks and, therefore, I find it preferable, although not essential from an operative standpoint, to ground the protected surfaces to the aeroplane chassis. When such ground is employed, a conductor 35 may be installed in the rear portion of each wing and connected by spaced branch 36 with the insulated surfaces near the rear edge. The conductor 35 may be grounded to the chassis 7, as indicated at 37. Some conditions may require the introduction of a resistance 38 in the conductor.

It should be manifest from the foregoing that I have provided a method and means for preventing the formation of ice on surfaces exposed to temperature and humidity conditions which are normally productive of ice. By imposing upon the aeroplane surfaces to be protected a positive electrical potential of such intensity that liquid particles contacting therewith will be instantaneously converted to a positive potential at which they are unable to congeal in the surrounding temperature, I am enabled to prevent ice formation at what are usually considered normal freezing temperatures.

By precluding the freezing of the liquid particles which contact the aeroplane surfaces at and for several degrees below 32° F., the formation of ice upon these surfaces is prevented at such temperatures. Should the atmospheric temperature drop to a point at which ice would form at the protected surface potential, a discontinuance of this potential will relieve all possibility of ice formation at the lower temperature because the atmospheric moisture at such temperature is in the form of either hail or snow which will not adhere to the aeroplane surfaces.

The structural details of the apparatus may be designed to meet the requirements of any particular installation and may vary within wide limits without departing from the scope of my invention as defined in the following claims.

I claim:

1. The method of preventing the formation of ice on a surface exposed to temperature and humidity conditions normally productive of ice, which comprises subjecting said surface to a direct electric current of low amperage and high voltage to thereby induce on said surface a positive electric potential capable of raising the electrical charge of liquid particles contiguous to said surface to a positive potential status.

2. The method of preventing the formation of ice on a surface exposed to temperature and humidity conditions normally productive of ice, which comprises inducing on said surface a positive electric charge of sufficient intensity to create a positive charge status in liquid particles contacting said surface, by applying to said surface a low amperage high voltage direct electric current.

3. The method of preventing the formation of ice on a surface exposed to temperature and humidity conditions normally productive of ice, which comprises impressing on said surface an electric charge from a high voltage current source of such low amperage that no appreciable temperature change in such surface is produced.

4. The method of preventing the formation of ice on a surface exposed to temperature and humidity conditions normally productive of ice, which comprises creating on said surface, by the delivery of high voltage low amperage current thereto, a positive electrical charge whereby liquid particles contacting said surface are positively charged, whereby the freezing point thereof is lowered.

5. The method of preventing the formation of ice on a surface exposed to temperature and humidity conditions normally productive of ice, which comprises subjecting said surface to a direct electric current of such character as to produce on said surface an electrical charge capable of varying from normal the temperature at which liquid particles contacting said surface will freeze.

6. The method of varying the critical freezing temperature of liquid particles, which comprises changing the electrical charge of said liquid by subjecting the same to a high voltage of a single polarity.

7. The combination with an aeroplane including a chassis and wings, of a covering for a portion of said wings of electrical conducting material electrically insulated from the remainder of the aeroplane, means for delivering to said covering a direct current of high voltage and low amperage so as to create a high positive potential on the surfaces of said insulated wing portions, and means connected to said portions at points remote from the delivery of current thereto for grounding said wing portions to the aeroplane chassis.

JOHN D. LARSON.